July 1, 1930.  L. A. DARLING  1,768,747
GLASS RETAINING MEANS FOR HEADLIGHTS
Filed July 13, 1927   2 Sheets-Sheet 1
FIG. I.
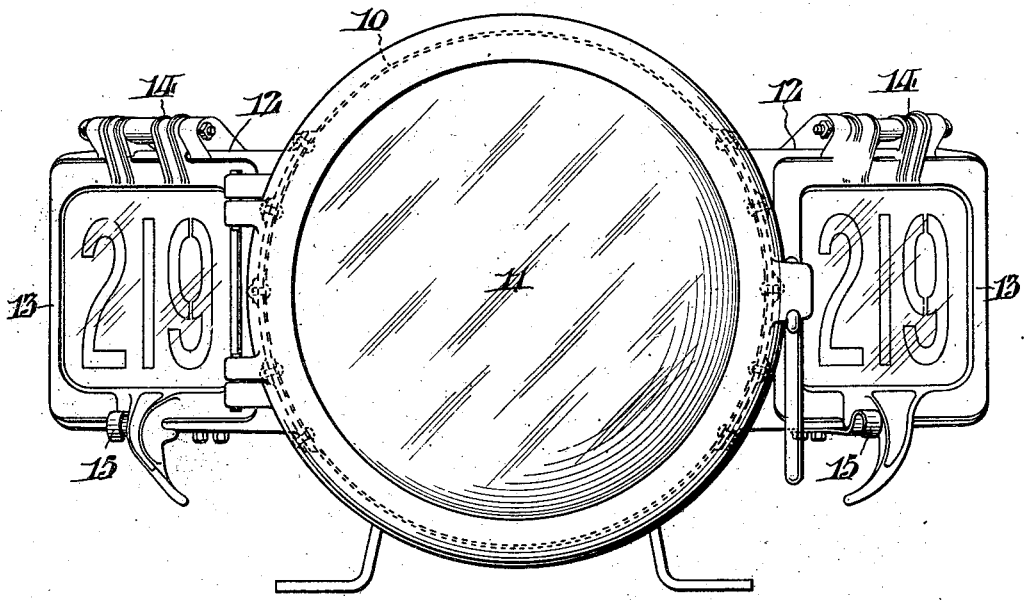
FIG. II.
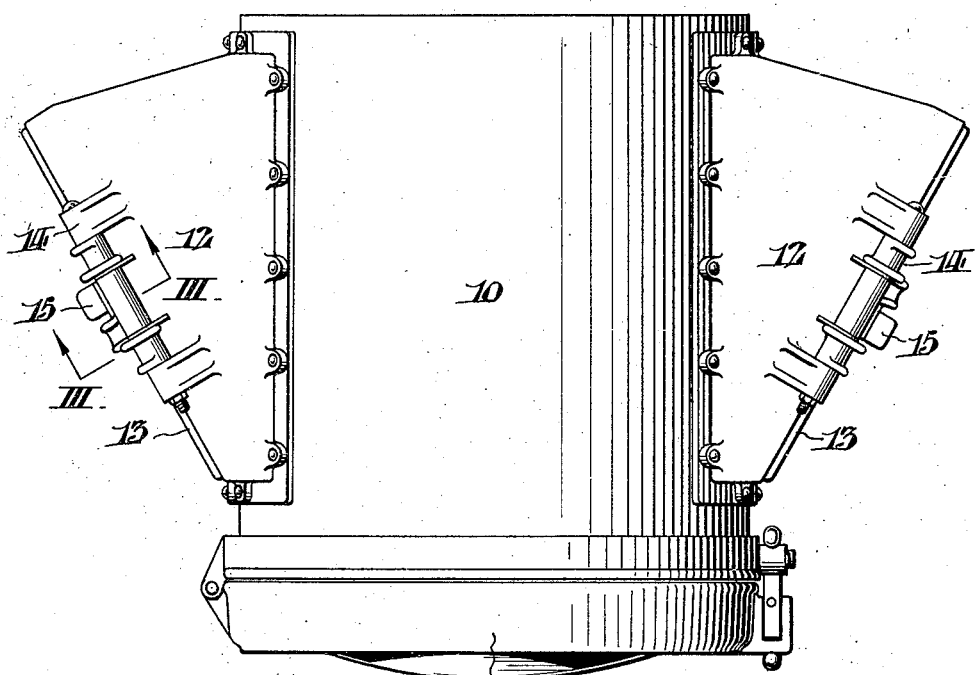
WITNESSES
Thomas W. Kerr, Jr.
John A. Weiler
INVENTOR:
Lewis A. Darling,
BY Fraley & Paul
ATTORNEYS.

July 1, 1930.  L. A. DARLING  1,768,747
GLASS RETAINING MEANS FOR HEADLIGHTS
Filed July 13, 1927   2 Sheets-Sheet 2
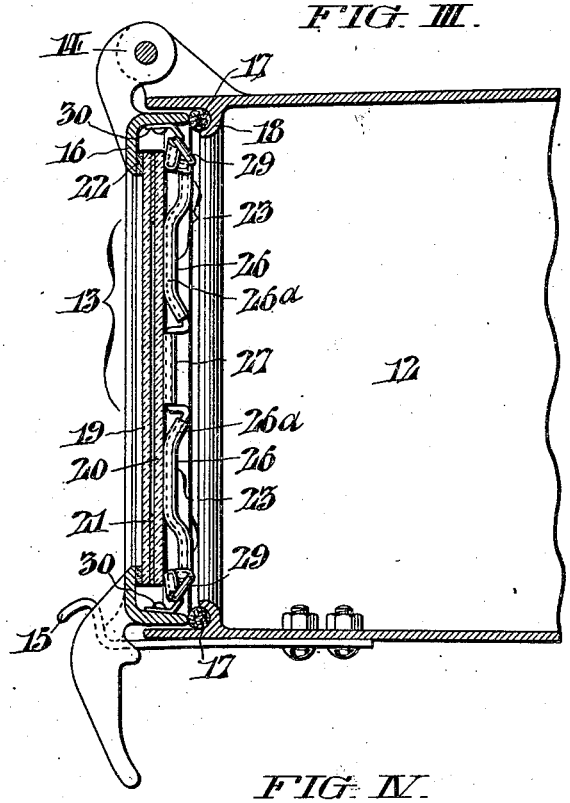
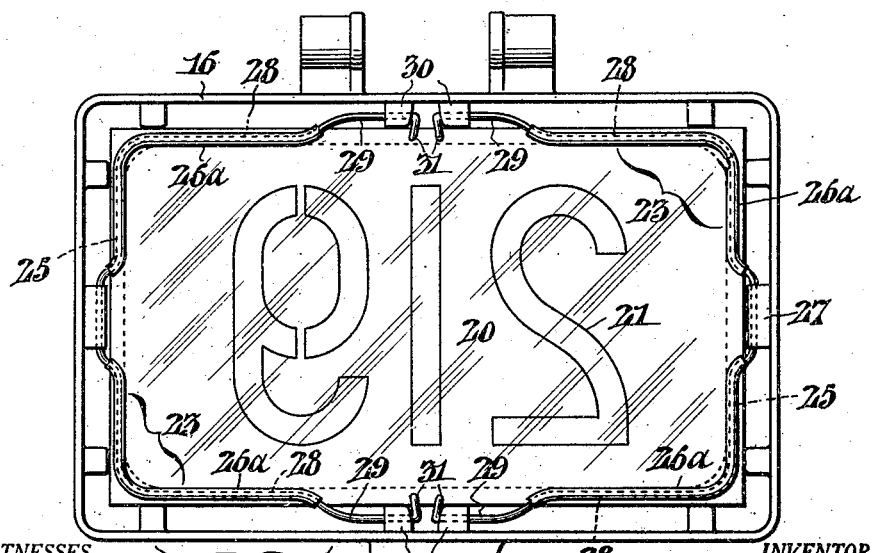
WITNESSES
INVENTOR:
Lewis A. Darling,
BY
ATTORNEYS.

Patented July 1, 1930

1,768,747

UNITED STATES PATENT OFFICE

LEWIS A. DARLING, OF GLENSIDE, PENNSYLVANIA, ASSIGNOR TO ELECTRIC SERVICE SUPPLIES COMPANY, OF PHILADELPHIA, PENNSYLVANIA, A CORPORATION OF PENNSYLVANIA

GLASS-RETAINING MEANS FOR HEADLIGHTS

Application filed July 13, 1927. Serial No. 205,488.

This invention relates to means for retaining glass in mounting frames provided for them, and is more particularly useful for retention of glasses or lenses in headlights such as used, for example, on locomotives, railway cars, or other vehicles.

Heretofore it has generally been the custom to employ screws and clips, or auxiliary screw-attached frames to hold such glasses in place. Devices of this kind often proved unreliable, the parts invariably working loose and becoming lost, thereby either permitting the glass to rattle under vibration communicated incidental to vehicular travel or to drop out entirely, with fracture and breakage resulting, thereby entailing costly replacements. Then again, the screws were liable to deterioration, thereby often corroding in place and rendering their removal either difficult or impossible when glass replacements were necessary. Moreover, fracture and breakage was often caused through localized strains set up in the glass due to uneven tightening of the clips or screws.

The purpose of the present invention is to obviate the objection above pointed out through provision of a self-contained yielding uni-part retaining means adapted to be permanently attached to the mounting frame and whereby the glass is held firmly in place over the opening in the frame without the possibility of working loose, and without induction of strains likely to result in fracture or breakage.

One way in which the foregoing desiderata can be conveniently attained in practice will be apparent from the detailed description which follows of the typical embodiment of this invention shown in the drawings, whereof Fig. I is a front view of a locomotive headlight equipped with my novel glass retaining means.

Fig. II is a plan view of the headlight.

Fig. III is a section taken locally, as indicated by the arrows III—III in Fig. II; and, Fig. IV is a rear view of one of the glazed doors of the structure.

The headlight chosen for convenience of illustration herein may be of any approved construction with a cylindric body 10, a frontal lens door 11, and inclined lateral box extensions 12 at opposite sides of said body. These box extensions 12 are closed by glazed number display doors 13 mounted to swing upwardly about hinges 14, and normally held closed by spring latches 15. As shown in Fig. III the frames 16 of the doors 13 are angular in cross section and so proportioned as to fit into the ends of the box extensions 12 with their edges engaging sealing gaskets 17, recessed in flanges 18, internally of said extensions. The opening in each of the door frames 16 is spanned by glass panes 19, 20 between which is interposed the numbered stencil plate 21, the outer glass 19 resting against a cushioning gasket 22 surrounding the door opening at the inside.

To firmly hold the glass panes 19, 20 in place, in the position illustrated, I provide retaining devices comprehensively designated 23 in Figs. III and IV, an opposed pair of such retaining devices being used in the present instance with each door 13. The devices 23 comprise flexible members 25 which may be conveniently fashioned from single lengths of comparatively stout spring wire to angular or U-shape configuration in conformity with the panes 19, 20 and door frame 16, and incidentally provided at spaced intervals, with lateral offsets 26— see Fig. III—to bear against perimetric margins of the inner pane 20. These offsets 26 may be covered with a sheathing 26a of resilient material, such as rubber tubing or the like, to prevent direct contact with the glass 20. The flexible members 25 of the two retaining devices 23 are permanently attached along opposite side edges of the door frames 16 preferably with the aid of pivot clips 27 welded or riveted in place. The extremities 28 of the members 25 are bent outward somewhat as at 29 with capacity for flexure into engagement with juxta-positioned hook lugs 30 located centrally of the top and bottom bars of the door frames 16. The ends of the extremities 28 are turned inward and upward as at 31 for service as finger grasps to facilitate manipulation of the members 25 in the manner explained. Like the pivot clips 27, the lugs 30 are in the present instance separately secured to the door frames 16 either by welding or riveting. With the members 25 thus held in compression it will be seen that the glass panes 19, 20 are firmly supported against the possibility of becoming loose or rattling, to the end of avoiding fracture or breakage. In case removal of the glass panes 19, 20 is required to enable interchange of the stencils 21, this may be easily and quickly accomplished by releasing the members 25 from engagement with the lugs 30 and swinging them outward about their pivotal connections 27 with the door frames 16. Permanent attachment of the retaining devices 23 to the glass mounting or door frame 16, obviously precludes their being lost incidental to change of the stencil plate 21.

From the foregoing it will be seen that my novel glass retaining means is entirely self contained, simple and economical to manufacture, easily applied to the mountings, and holds the glass firmly yet yieldingly in place without imposition of harmful strains. My invention is obviously susceptible to expression in other forms than herein shown, and adapted to uses other than that above specifically described. The appended claims are therefore to be construed with these pertinent considerations in mind.

Having thus described my invention, I claim:

1. A retaining means for glass mountings comprising a flexible member fashioned from a length of spring wire to conform to the edge configuration of the glass with its terminals fashioned as manipulator components and arranged to bear at intervals against the perimetral margin of said glass, means for pivotally and non-removably supporting said wire upon the glass mounting, and lugs carried by the mounting at points spaced from said pivotal support for engaging the ends of the wire to thereby cause the latter to bear resiliently against the glass.

2. A headlight for vehicles with flanking extensions closed by glazed doors, each door comprising a hinged frame adapted to receive a pane of glass, pivot clips on the frame at points of the opening therein, a yielding member permanently hinged midway of its length to each of the pivot clips and individually configured to bear at intervals against the perimetric margin of the glass inner face, hook lugs on the frame aforesaid with which the ends of the yielding members releasably engage in firmly retaining the glass in position, and said yielding members having their free ends fashioned to provide manipulator finger grasps.

3. In combination, an open frame having a seat for receiving the marginal edge of a lens, said frame being provided at one point thereof with a pivot clip and at points spaced to either side of said clip with lugs directed inwardly of said frame and toward each other, and a retaining means for said lens fashioned from a single length of spring wire to the edge configurations of the lens, the intermediate section of said wire having a part offset from the lens edge and toward the seat therefor, said central offset part being non-removably received within said pivot clip, the free ends of the wire being offset from said lens seat and adapted to be releasably engaged by said lugs.

4. In combination, an open frame having a lens supporting ledge and surrounding walls, a flexible lens retaining member fashioned from a single length of spring wire and including sections arranged to parallel two of the opposite walls and an intermediate wall of the frame, the intermediate section of the wire being provided with a part offset toward the adjacent ledge section of the frame, a pivot clip completely embracing said offset part of the wire and secured to the intermediate wall of the frame, and lugs on opposite walls of the frame for detachably receiving the free ends of the side sections of the lens retaining wire, said free ends being offset toward the opposite walls of the frame and away from the adjacent ledge sections thereof.

5. A retaining means for glass mountings comprising a yielding member having its extremities fashioned as finger grips, said member being adapted to bear at spaced intervals against the glass, a pivot clip on the glass mounting adapted to embrace and form a pivotal and retaining support for a portion of said member, and hook lugs on the mounting arranged to releasably engage portions of said member adjoining the finger grasps aforesaid, said portions constituting the extremities of said yielding member.

In testimony whereof, I have hereunto signed my name at Philadelphia, Pennsylvania, this 8th day of July, 1927.

LEWIS A. DARLING.